Figures 1, 2:
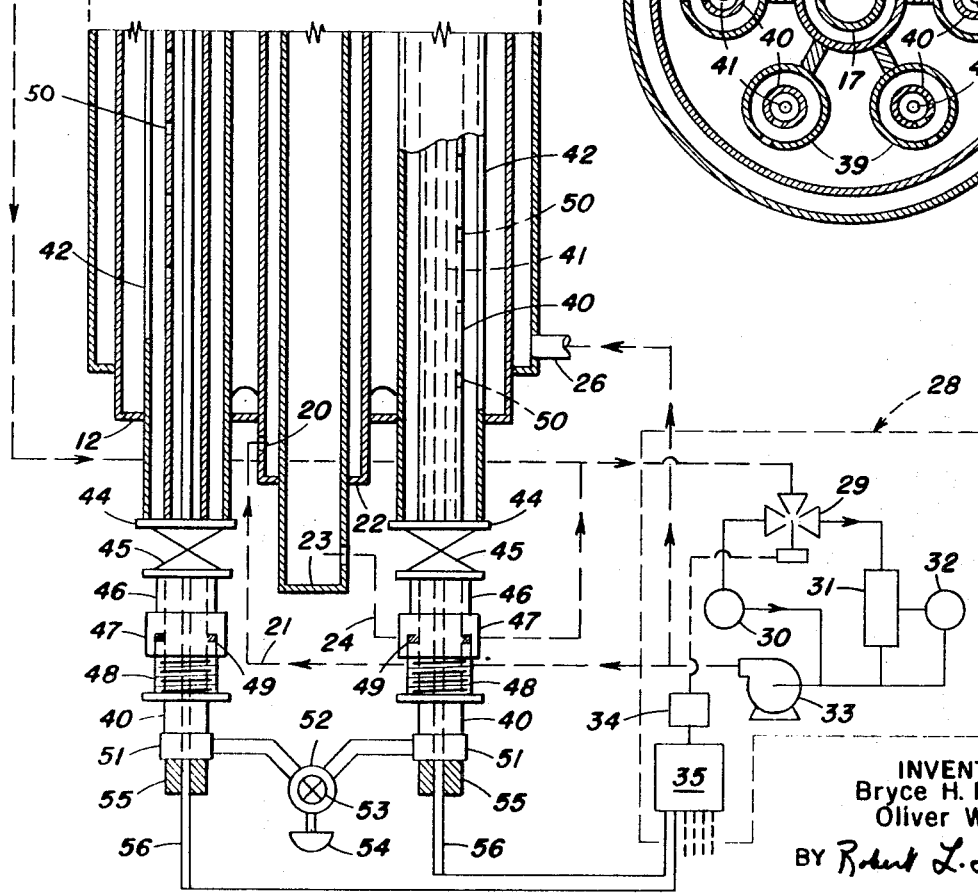

United States Patent

[11] 3,615,182

| [72] | Inventors | Oliver W. Moles<br>Edmond, Okla.;<br>Bryce H. McMullen, New Shrewsbury, N.J. |
|---|---|---|
| [21] | Appl. No. | 871,318 |
| [22] | Filed | Nov. 14, 1969 |
| [23] | | Division of Ser. No. 586,709, Oct. 14, 1966, Pat. No. 3,492,097. |
| [45] | Patented | Oct. 26, 1971 |
| [73] | Assignee | NL Industries, Inc.<br>New York, N.Y. |

[54] PROCESS FOR GENERATING METAL HALIDES
2 Claims, 2 Drawing Figs.

| [52] | U.S. Cl. | 23/93, 23/1 B, 23/87 R, 23/92, 23/202 |
|---|---|---|
| [51] | Int. Cl. | C01f 7/56, C01f 7/58 |

[50] Field of Search........................................23/87, 87 T, 93, 1, 92, 202 V

[56] References Cited
UNITED STATES PATENTS

| 2,768,070 | 10/1956 | Brazaitis | 23/93 |
| 2,937,082 | 5/1960 | Johnston et al. | 75/10 |
| 3,078,145 | 2/1963 | Gayol | 23/93 |
| 3,222,127 | 12/1965 | Wilson | 23/93 |
| 3,492,097 | 1/1970 | Moles et al. | 23/1 X |

Primary Examiner—Edward Stern
Attorneys—Charles F. Kaegebehn, Robert L. Lehman and Harold L. Gammons ABSTRACT: The present invention relates in general to the production of a metal halide and more especially to an improved process and apparatus for producing vaporous aluminum chloride.

PATENTED OCT 26 1971

3,615,182

INVENTORS
Bryce H. McMullen
Oliver W. Moles

BY Robert L. Lehman
AGENT

PROCESS FOR GENERATING METAL HALIDES

This application is a division of application Ser. No. 586,709, filed Oct. 14, 1966, now U.S. Pat. No. 3,492,097, issued Jan. 27, 1970.

Early in the development of the so-called vapor-phase process for producing pyrogenic $TiO_2$ pigment, it was discovered that the addition of vaporous aluminum chloride to the reactants was essential to the production of a rutile $TiO_2$ pigment of optimum pigmentary properties. As a consequence much time and effort has been expended in the development of a commercially feasible process for producing vaporous aluminum chloride. Earlier methods include subjecting a static or fluidized bed of aluminum metal to a stream of gaseous chloride or chlorine-containing gases. However, many difficulties were encountered due primarily to the exothermic nature of the reaction of chlorine with aluminum which lead to serious overheating of the bed, plugging and corrosion of feed pipes and erratic generation of aluminum chloride.

An object of the present invention is to provide an improved process and apparatus for producing a gaseous metal halide by reacting a gaseous halide with a particulate metal. A further object is to provide a process and apparatus for the continuous production of a metal halide at a controlled rate. Another object of the invention is to provide an improved process and apparatus for producing gaseous aluminum chloride by reacting gaseous chlorine with particulate aluminum metal in a static bed-type generator wherein the chlorine feed is shielded from direct contact with the aluminum metal so as to avoid hot sports in the bed and plugging of the chlorine feed. A further object of the invention is to provided improved apparatus for generating a gaseous metal halide wherein the heat exchange medium bears a critical relationship to every point in the bed where the gaseous halide reacts with the metal, so as to preclude local overheating in the bed and insure controlled rates of production.

A still further object of the invention is to provide improved apparatus for generating a gaseous metal halide wherein the distributor pipes used to feed the halide into the static bed of the generator are assembled therein a manner to provide quick and easy removal for cleaning and/or replacement.

Other objects, features and advantages of the invention will become more apparent from the following more complete description and the drawing in which:

FIG. 1 is a vertical elevation partly in section of the static bed metal halide generator of this invention; and FIG. 2 is a transverse action of the generator on line 2—2 of FIG. 1.

As mentioned above production of gaseous aluminum chloride with solid particles of aluminum metal presents serious problems of heat control due primarily to the exothermic nature of the reaction. In the course of the research and development that led to the present invention it was discovered that the proximity of the heat exchange medium to every point in the bed at which the chlorine reacts with the aluminum metal, hereinafter preferred to as reaction sites, is critical to a controlled rate of production and a fusion-free bed; and that from the standpoint of a large scale commercial operation such as carried out in the manner and by the means hereinafter described, the maximum permissible distances between the heat exchange medium and any reaction site is not greater than about 4 inches, and distance less then 4 inches being preferred.

In its broadest aspects therefore the present invention relates to a method and means for generating a gaseous metal halide wherein a static bed of particulate metal is retained in a generator casing, a gaseous halide is fed substantially uniformly through said bed of particulate metal to react therewith and form a gaseous metal halide and a heat exchange medium is maintained within a critical distance of each reaction site in said bed.

The description which follows pertains to apparatus designed for commercial operation wherein the heat exchange means for maintaining a critical distance between the heat exchange medium and each reaction site in the bed comprises a heat exchange probe and a heat exchange jacket concentrically arranged with respect thereto and interconnected for the circulation of a heat exchange medium therethrough. These and other details of the generator essential to its operation on a commercial scale are described below.

Referring to the drawing the apparatus comprises a generator casing 10 having a top plate 11 and a bottom plate 12. An exhaust pipe 13 is provided in the top plate 11 for discharging the gaseous metal halide from the generator casing. As mentioned above the heat exchange means comprises a heat exchange probe 14 and a heat exchange jacket 15 concentrically arranged with respect thereto, the probe 14 being arranged in the center of the generator casing and the jacket 15 being arranged on the outside wall of the generator casing.

The probe 14, is arranged to be supported by the bottom plate 12 of the generator casing and is spaced radially from and concentrically to the outer wall thereof. The overall height of the probe 14 is less than that of the generator casing and will be seen to comprise an outer tube 16 and an inner tube 17 nested therein, the latter being spaced radially from the outer tube 16 to provide an annular chamber 18 therebetween. The upper end of the outer tube is closed by a cap 19. The lower end of the outer tube 16 extends through a central aperture in the bottom plate 12 in which it is welded or otherwise secured, the portion of the other tube that extends below the bottom of the casing 10 being provided with an aperture 20 in the wall thereof in which is connected an inlet pipe, indicated by broken line 21, for feeding a heat exchange medium into the outer tube 16. Further, the bottom of the latter is closed by a centrally apertured plate 22 the central aperture of which is adapted to accommodate the lower end of the inner tube 17.

As shown in the drawings the overall length of the inner tube 17 is somewhat less than that of the outer tube such that the upper edge of the inner tube is below the upper end of the outer tube whereby a heat exchange medium in the annular chamber 18 may flow over the upper edge of and into the inner tube. The lower end of the inner tube 17 projects through the centrally apertured plate 22 and is capped as indicated at 23; and an outlet pipe, indicated by broken line 24, is secured in an aperture in the wall of this portion of the inner tube for discharging the heat exchange medium therefrom.

Thus it will be clear that a heat exchange medium fed into the probe via the inlet pipe 21 will rise up in its annular chamber 18, flow over the upper edge of the inner tube 17 down into the bottom thereof and be discharged therefrom via the outlet pipe 24.

The other of the two concentrically arranged heat exchange members comprises the jacket 15 which surrounds the outer wall of the generator casing 10 in a manner to form an annular chamber 25 therewith, the latter being provided with an inlet pipe 26 and outlet pipe 27 for circulating a heat exchange medium therethrough.

In the embodiment of the invention shown herein the heat exchange medium is a high boiling point oil or chlorinated phenol, and is adapted to be circulated through both the probe 14 and the jacket 15 by suitable piping connected to a heat exchanger indicated generally at 28. The latter comprises a solenoid actuated three-way selector valve 29 one side of which is connected to a cooling unit 30 and the other side to a gas fired heater 31 the latter being provided with a temperature responsive device 32 for regulating the temperature of the heater. A pump 33 is arranged to circulate the heat exchange medium through the heat exchanger, and a second temperature responsive device 34, connected between the selector valve 29 and a temperature monitoring device 35, is adapted to automatically set the selector valve at the proper position, i.e., either for cooling or heating the heat exchange medium depending upon the demand of the monitoring device 35 which, as shown schematically in the drawing, is adapted to respond to signals of thermocouples 56 which are connnected thereto and in the bed of the generator as hereinafter described.

Referring to FIG. 1 it will be seen that the probe 14 is one element of an integrated core-piece 36 the other elements of which comprise a plurality of tubular gas distributors indicated generally at 37, each being attached to the probe 14 by means of a longitudinal rib 38 extending radially outwardly therefrom the entire unitary assembly being substantially star shaped in cross section as shown especially well in FIG. 2.

In the present embodiment of the invention there are six of these tubular gas distributors each extending nearly the full length of the probe 14 and each comprising three concentric tubes; and outer tube 39 hereinafter referred to as a distributor pipe guard; an intermediate tube 40, referred to as a halide distributor pipe; and an inner tube 41 which serves as a thermocouple well.

Each distributor pipe guard 39 is provided throughout its length with a longitudinal slot 42 substantially diametrically opposite its point of attachment with its respective rib 38. The upper end of each pipe guard 39 is closed by a cap 43 and its lower end extends through an appropriately located aperture in the base plate 12 of the casing to which it is welded or otherwise securely fastened. A metal disc 44 is welded to the bottom of each distributor pipe guard and provides a flange for securing a gate valve 45 between the flange 44 and a flanged pipe 46 the pipe portion of which is secured in the upper end of a packing gland 47. A packing gland sleeve 48 is threaded into the bottom end of the packing gland 47 and is adapted to compress packing 49 in the gland.

As pointed out above, the instant invention features the ready removal of the halide distributor pipes 40 for cleaning and/or replacement and to this end each halide distributor pipe 40 is adapted to be inserted into the open bottom end of the packing gland 47 of its respective pipe guard and to be moved upwardly through its gate valve 45 (the latter being open) to a predetermined height in its pipe guard at which the distributor pipe 40 is releasably held by tightening the packing gland sleeve 48. Concerning the gate valves 45, the latter are normally open but are adapted to be closed whenever the distributor pipes 40 are removed from their pipe guards 39 for cleaning or replacement to prevent escape of chlorine or aluminum chloride gas from the generator.

With reference to the distributor pipes 40 these are designed to feed a halide gas into a static bed of particulate material in the generator casing 10 in a direction outwardly radially from the center thereof. To this end each distributor pipe 40 is closed at its upper end; and extending longitudinally thereof are a plurality of equally spaced holes 50 arranged substantially opposite the longitudinal slot of its respective pipe guard. The lower end of each distributor pipe 40 extends downwardly beyond the base plate 12 of the casing 10, through the gate valve and packing gland of its respective distributor pipe guard, as described above, and is connected at its bottom end by a tee 51 to a halide feed line 52. The latter is provided with a valve 53 adapted to be actuated by suitable valve control means 54. The latter may be operated manually; or if desired it may be operated automatically by the aforementioned monitoring device 35.

The innermost pipe 41 of each tubular gas distributor 37 constitutes a thermocouple well the upper end of which is closed; while the lower end extends downwardly beyond the tee of its respective distributor pipe and through a plug 55 which closes the bottom end of the latter. A thermocouple 56 is adapted to be inserted up into each thermocouple well 41 from the bottom end thereof to any selected height therein for measuring the temperature of the static bed at that particular point.

As shown in FIG. 2 the overall diameter of the star-shaped core-piece 36, hereinabove described, is less than the I.D. of the generator casing 10 such that an annular chamber is provided therein which is adapted to be filled with a solid particulate metal to form a static bed. In this connection the overall diameter of the core-piece 36, the O.D. of the probe 14 and the I.D. of the generator casing 10 are selected so that substantially every point in the bed will be no more than about four inches either from the probe 14 or the jacket 15. The metal in the bed may vary in size from a powder to fairly large lumps and is adapted to be fed into the generator casing via an inlet pipe 57 provided with a suitable valve 58 designed to admit successive charges of metal into the generator while excluding the the admission of air.

The operation of the halide generator may be described briefly as follows: The generator casing 10 is charged with particulate metal via the feed pipe 57 and valve 58 to about three-fourths of its height to form a static bed therein. The heat exchanger pump 33 is then started up to circulate the heat exchange medium through both the probe 14 and the jacket 15 of the generator casing to control the temperature of the static bed therein.

As startup the selector valve 29 of the heat exchanger 28 directs the flow of the heat exchange medium through the gas fired heater 31 so as to heat the heat exchange medium. The purpose of this is twofold namely; to raise the temperature of metal in the bed sufficiently to initiate reaction of the gaseous halide with the metal; and to maintain the temperature in the bed sufficiently high, during startup and shutdown, to preclude condensation of the gaseous metal halide in the bed and in the related piping. As soon as the monitoring device 35, by its thermocouple connections in the bed, registers the proper temperature level in the bed for initiating a reaction between the halide and the metal the valve control means 54 is actuated to open the valve 53 and feed the halogen gas into the distributor pipes 40.

The halide gas issues from the drilled holes 50 up and down the length of the distributor pipes and from thence through the longitudinal slots of their respective pipe guards to spread substantially uniformly through the bed of particulate metal in a direction outwardly radially from the center thereof. The gaseous metal halide which is produced by the reaction of the halide gas with the metal of the bed is discharged from the generator via the outlet pipe 13. Where the reaction is exothermic in nature, as for example when chlorine is reacted with aluminum metal, it is essential to the successful operation of the generator that heat be removed from the bed to prevent fusing and/or sintering thereof; and this is accomplished by means of the central probe 14 and jacket 15 of the heat exchange means hereinabove described in conjunction with the heat exchanger 28 which, by its thermocouple connections to the monitoring device 35 is adapted to direct the flow of heat exchange medium through the cooling unit 30.

It will be evident that during operation of the generator to produce a gaseous metal halide the small holes in the distributor pipes 40 are not directly in contact with the metal of the bed but instead are spaced or separated therefrom by the guards 39. Hence the development of excessive heat or hot spots at or adjacent the small discharge holes of the distributor pipes, that otherwise would accelerate corrosion and deterioration of the distributor pipes, is prevented. Moreover since the reaction between the halide and the metal of the bed takes place outside the tubular guards any condensed metal halide that may form is prevented from collecting on the distributor pipes and or plugging the small discharge holes thereof. As a consequence the latter are kept clear for the free flow of halide gas therefrom thereby obviating local over heating and other malfunctioning.

As a specific illustration of the instant invention a generator casing was used which was approximately 8 feet high and 12.5 inches in diameter. The starlike core-piece 36 was 5 feet 9 inches in height and its overall diameter was approximately 7 inches. The O.D. of the probe 14 was 4 inches. The particular metal used to form the static bed comprised small lumps of aluminum metal. The coolant used in the heat exchange was a chlorinated phenol and it was circulated through the central probe 14 and jacket 15 of the heat exchange means at the rate of 25 gals./min. The halide gas was chlorine and this was fed into the six distributor pipes 40 at the rate of about 1.5 cu. ft. per min. and reacted with the particulate aluminum metal of the static bed to produce gaseous aluminum chloride. The operation was run without malfunctioning, local overheating of the bed or untoward plugging or deterioration of the distributor pipes.

The invention thus provides an improved method and means for producing a gaseous metal halide and in particular aluminum chloride using a static bed type generator wherein fusing or sintering of the bed, local hot spots or plugging or corrosion of the gas distribution pipes is avoided, the operation being smooth and free of malfunctioning.

While this invention has been described and illustrated by the examples shown, it is not intended to be strictly limited thereto, and other variations and modifications may be employed within the scope of the following claims.

We claim:

1. In a static bed process for producing gaseous aluminum chloride by reacting gaseous chlorine with aluminum metal at elevated temperatures the improvement comprising: maintaining a static bed comprising a substantially vertical column of particulate aluminum metal, feeding gaseous chlorine into said vertical column of particulate aluminum metal at a plurality of apertures spaced vertically up and down the length thereof through a vertical, annular, guarded distribution conduit containing said apertures, each of the apertures being substantially spaced from the particulate aluminum metal particles of the bed to react with said aluminum metal and form gaseous aluminum chloride plus exothermic heat, and controlling the temperature in said static bed of particulate aluminum metal by supplying a coolant in heat exchange contact with both the exterior surface and the center portion, respectively, of said bed, and wherein the gaseous chlorine is fed into said bed substantially radially outwardly with respect to the center portion thereof.

2. In a static bed process for producing gaseous aluminum chloride according to the improvement of claim 1 wherein the gaseous chlorine is fed into said bed at apertures substantially equidistant between the coolant at the exterior surface thereof and the coolant at the center portion thereof.

* * * * *